(12) United States Patent
Hallgren et al.

(10) Patent No.: US 11,238,886 B1
(45) Date of Patent: Feb. 1, 2022

(54) GENERATING VIDEO INFORMATION REPRESENTATIVE OF AUDIO CLIPS

(71) Applicant: Audios Ventures, Inc., Troy, NY (US)

(72) Inventors: Stephen Matthew Hallgren, Albany, NY (US); Alan Bradley Smith, Kingston, NY (US)

(73) Assignee: AUDIOS VENTURES INC., Troy, NY (US)

( * ) Notice: Subject to any disclaimer, the term of this patent is extended or adjusted under 35 U.S.C. 154(b) by 234 days.

(21) Appl. No.: 16/243,957

(22) Filed: Jan. 9, 2019

(51) Int. Cl.
| | |
|---|---|
| G10L 21/10 | (2013.01) |
| G06F 16/64 | (2019.01) |
| G06F 16/638 | (2019.01) |
| G10L 21/18 | (2013.01) |

(52) U.S. Cl.
CPC ............ *G10L 21/10* (2013.01); *G06F 16/638* (2019.01); *G06F 16/64* (2019.01); *G10L 21/18* (2013.01)

(58) Field of Classification Search
CPC ......... G10L 21/10; G10L 21/18; G10L 15/26; G10L 13/00; G10L 25/21; G06F 16/64; G06F 16/638; G06F 16/248; G06F 16/90335; G06F 16/9035; G06F 16/9535; G06F 16/9538; G06F 1/163; G06F 1/1632; G06F 1/1647; G06F 3/011; G06F 3/0416; G06F 3/0484; G06F 3/04847; G06F 3/1423; G06F 3/147; G06F 16/93; G06F 16/438; G06F 16/45; G06F 16/483; G06F 16/743; G06F 16/90332; G06F 2203/0381; G06F 3/0346; G06F 3/038; G06F 3/0488; G06F 40/221
See application file for complete search history.

(56) References Cited

U.S. PATENT DOCUMENTS

| | | | | |
|---|---|---|---|---|
| 8,966,369 | B2* | 2/2015 | Worthen | G11B 27/034 |
| | | | | 715/719 |
| 9,070,409 | B1* | 6/2015 | Yntema | G10L 21/10 |
| 9,071,814 | B1* | 6/2015 | Fan | H04N 5/91 |
| 10,123,068 | B1* | 11/2018 | Morris | H04N 5/9206 |
| 10,152,479 | B1* | 12/2018 | Granstrom | G06F 16/483 |
| 10,311,893 | B2* | 6/2019 | Gibbon | G06F 16/683 |
| 10,504,504 | B1* | 12/2019 | Meltzner | G10L 25/18 |
| 2011/0113331 | A1* | 5/2011 | Herberger | G06F 16/683 |
| | | | | 715/716 |
| 2012/0323575 | A1* | 12/2012 | Gibbon | G11B 27/34 |
| | | | | 704/246 |
| 2012/0323897 | A1* | 12/2012 | Daher | G06F 16/433 |
| | | | | 707/723 |

(Continued)

*Primary Examiner* — Abdelali Serrou
(74) *Attorney, Agent, or Firm* — Fenwick & West LLP

(57) ABSTRACT

A service for automatically generating video representations of audio content is provided. A video representation generation component receives a request with search criteria related to processing audio content to generate video representations of the content. The video representation generation component then identifies one or more audio clips or segments from the audio content responsive to the search criteria. The video representation generation component can then generate or obtain video representations of the audio clips without requiring a generation of representations of the full audio content. The processing result can be utilized used to publish to social media sites or electronic communications as video content.

18 Claims, 9 Drawing Sheets

(56) References Cited

U.S. PATENT DOCUMENTS

| | | | | |
|---|---|---|---|---|
| 2013/0124984 A1* | 5/2013 | Kuspa | ................ | H04N 21/4307 |
| | | | | 715/255 |
| 2013/0308874 A1* | 11/2013 | Togashi | ................ | H04N 19/80 |
| | | | | 382/264 |
| 2015/0205570 A1* | 7/2015 | Johnston | ............ | G06F 3/04845 |
| | | | | 715/716 |
| 2015/0213793 A1* | 7/2015 | Phelan | .................... | G10L 21/10 |
| | | | | 704/260 |
| 2017/0323655 A1* | 11/2017 | Gibbon | ................ | G06F 16/686 |
| 2019/0371192 A1* | 12/2019 | Chandra | .................. | G09B 5/06 |
| 2020/0035234 A1* | 1/2020 | Aarabi | ................... | G06N 20/00 |

* cited by examiner

US 11,238,886 B1

GENERATING VIDEO INFORMATION REPRESENTATIVE OF AUDIO CLIPS

BACKGROUND

Generally described, computing devices and communication networks can be utilized to exchange data and/or information. In a common application, a computing device can request content from another computing device via the communication network. For example, a user at a personal computing device can utilize a browser application to request a content page (e.g., a network page, a Web page, etc.) from a server computing device via the network (e.g., the Internet). In such embodiments, the user computing device can be referred to as a client computing device and the server computing device can be referred to as a content provider.

Content providers provide requested content to client computing devices often with consideration of efficient transmission of the requested content to the client computing device and/or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

Some content providers attempt to facilitate the delivery of requested content through the utilization of a content delivery service provider. As with content providers, content delivery service providers also provide requested content to client computing devices often with consideration of efficient transmission of the requested content to the client computing device and/or consideration of a cost associated with the transmission of the content.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
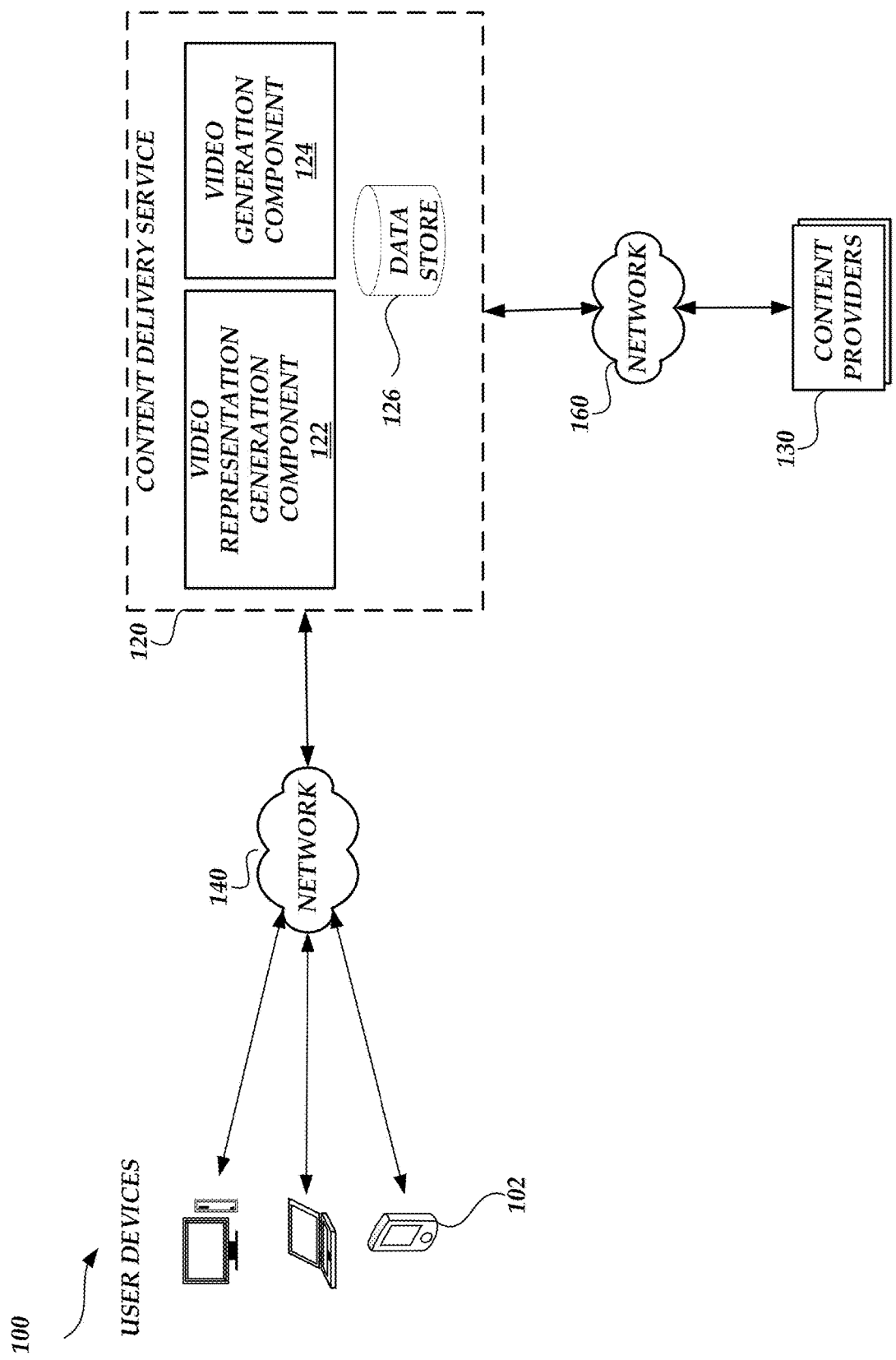
FIG. 1 is a block diagram of a content delivery environment that includes one or more user devices, a content delivery service, and an audio clip provider according to one embodiment.

Generally described, content providers can provide content to requesting users. With regard to audio content, a content provider can implement a content delivery service that is able to deliver audio content to requesting users, such as podcasts or audio streams. Illustratively, a content provider indexes a collection of source audio content or video content (either live streaming or file-based) and delivers it to clients via a wide range of communication protocols such as HTTP Live Streaming ("HLS"), Dynamic Adaptive Streaming over HTTP ("DASH"), HTTP Dynamic Streaming ("HDS"), Real Time Messaging Protocol ("RTMP"), Smooth Streaming, and the like. Based on consumer demand, a content provider can also provide advanced transmission features such as just-in-time packaging of content, digital rights management ("DRM") encryption, time-shifting, bitrate selection, and more.

In some embodiments, original audio content can be processed into one or more graphical or video representations that facilitate transmission, publication or playback. Such processing of audio files is often referred to as audiograms or video representations of audio files. For example, a content provider can process an audio file corresponding to a 60 minute podcast into a video file format, such as in accordance with the MPEG video format. The video file includes a video format having graphics, text, and representations of the audio wave file. The file continues to include the audio file as the corresponding audio portion of the video file. By processing the original audio content into a video file, users can often access video files via media applications, video playback equipment, or utilize network resources, such as social media resources, that are configured for video file sharing/publication.

Generally, original content providers typically generate video representations, also known as audiograms, as a mechanism for creating additional or alternative distribution channels for audio content. In such applications, the content provider generates a video representation of a full portion of the audio content. More specifically, the video representation is embodied as a video file that is intended to be accessed or played by a software application configured specifically to play video file formats. The video representations include video images or still images that are rendered on the display and the audio content that is presented as part of the audio track of the video file. Generation of full video representations can be resource intensive, especially for longer length audio files. Receiving users may be able to access the video representations provided by a content provider and utilize traditional playback controls to select portions of the audio information for playback. However, users are not typically allowed to select portions of audio content that are generated into video representations, including selecting multiple excerpts (e.g., portions) of audio content. Users are typically limited in utilizing full portions of video representations, which places greater strain on computing and network resources. Still further, in some implementations, social media platforms can limit the amount of video data that can be shared by individual users, such as by limiting video files that can be shared by implementing time or file size restrictions. Accordingly, users may not be able to share full video representations of audio content.

To address at least a portion of the inefficiencies described above with regard to processing content to generate or distribute video representations of audio content, aspects of the present application correspond to a service for facilitating the generation of video representations of content based on portions of audio content. Generally, a video representation generation component receives content from a content provider, such as streaming audio content. The content provider can provide additional information about the audio content, such as metadata, that can be utilized to process the audio content into a subset of audio clips or audio segments. The metadata can include timing information that identifies one or more reference points in the audio content in which audio segments or clips may occur, such as chapter endings, scene or subject matter transitions, significant events (e.g., punchlines), and the like. The metadata can also include (additionally or alternatively) keywords or other indicia corresponding to the subject matter of the audio content or portions of the content that can be utilized to identify or group audio segments/clips. Such keywords can correspond to the topic/subject matter of the audio content, the originator of the audio content (e.g., speaker) or descriptive information.

The video representation generation component receives a request with search criteria related to processing audio content to generate video representations of the content. For example, the video representation generation component can illustratively receive information from a user, such as via a graphical interface, that identifies the content to be used to generate video representations and information identifying the specific audio segments to be included or search criteria for identifying the specific audio segments. The video representation generation component then identifies one or more audio clips or segments from the audio content responsive to the search criteria that forms the subset of audio segments/clips that form the video representations.

The video representation generation component can then generate or obtain video representations of the set of audio segments/clips without requiring a generation of representations of the full audio content. Generally, the video representations of audio content correspond to a utilization of a video file format that includes one or more visual representations, including static images, dynamic images, text, waveforms, and the like, of the audio clips/segments. The video representation further includes the audio content corresponding to the selected audio clips/segments. Illustratively, the attributes of the visual representation (e.g., the video file type, duration, file size, etc.) may be configured to utilized in conjunction with social media Web sites. The visual representations may be selected by the content provider, user or the video representation generation component and can provide identification information about the video representation (e.g., artist, subject matter, timing information, etc.). The video representation can illustratively be transmitted or published in accordance with various media and resources configured to receive video file formats, such as social media resources. In one aspect, the video representation generation component can maintain a data store that maintains previously generated video representations and that can be utilized again by video representation generation component.

In another aspect, the video representation generation component can generate or cause to be generated any video representations that have not been previously generated. The resulting set of video representation form a process result that can be utilized transmitted or outputted to various destinations, such as by publishing to social media sites or transmitted as attachments/embedded content in electronic communications.

FIG. 1 illustrates a general content delivery environment 100 for delivering content from original content providers to user devices. The content delivery environment 100 includes a plurality of devices 102 utilized by individual users, generally referred to as client computing devices, to request streaming or download content from a content delivery service 120. Illustratively, the content delivery service 120 can correspond to one or more services utilized in the transmission of the encoded content to user device 102. The content delivery service 120 can include one or more services that index a collection of source content (either live streaming or file-based audio content), generates one or more video representations of the audio content, and deliver the source content to clients via a wide range of communication protocols such as HTTP Live Streaming ("HLS"), Dynamic Adaptive Streaming over HTTP ("DASH"), HTTP Dynamic Streaming ("HDS"), Smooth Streaming, Real Time Messaging Protocol ("RTMP"), and the like. The content can be illustratively provided by one or more origin sources, such as original content provider 130.

User computing devices 102 may include any number of different computing devices capable of communicating with the networks 140, 150, 160, via a direct connection or via an intermediary. For example, individual accessing computing devices may correspond to a laptop or tablet computer, personal computer, wearable computer, server, personal digital assistant (PDA), hybrid PDA/mobile phone, mobile phone, electronic book reader, set top box, camera, appliance (e.g. a thermostat or refrigerator), controller, digital media player, watch, glasses, a home or car device, Internet of Thing ("IoT") devices, virtual reality or augmented reality devices, and the like. Each client computing device 102 may optionally include one or more data stores (not shown in FIG. 1) including various applications or computer-executable instructions, such as web browsers, used to implement the embodiments disclosed herein.

Networks 140 and 160 may be any wired network, wireless network, or combination thereof. In addition, the networks 140 and 160 may be a personal area network, local area network, wide area network, cable network, fiber network, satellite network, cellular telephone network, data network, or combination thereof. In the example environment of FIG. 1, network 140 is a global area network (GAN), such as the Internet. Protocols and components for communicating via the other aforementioned types of communication networks are well known to those skilled in the art of computer communications and thus, need not be described in more detail herein. While each of the client computing devices 102 and the content delivery service 120 are depicted as having a single connection to the network 140, individual components of the client computing devices 102 and content delivery service 120 may be connected to the network 140 at disparate points. Accordingly, communication times and capabilities may vary between the components of FIG. 1. Likewise, although FIG. 1 is illustrated as having separate networks 140 and 160, one skilled in the relevant art will appreciate that the content delivery service 120 may utilize any number or combination of networks.

In accordance with embodiments, for purposes of illustration, the content delivery service 120 includes one or more servers for receiving content from original content providers 130 and processing the content. As described in further detail below, the content delivery service 120 can include a video representation generation component 122 for processing audio content and generating video representations of one or more audio segments or audio clips as will be described herein. The content delivery service 120 can also include a video generation component 124 that can be utilized to generate individual video representations based on audio segments. In some embodiments, the video generation component 124 may be considered a separate service or component to the video representation generation component 122. Alternatively, the video representation generation component 122 and the video generation component 124 may be integrated or combined into a single component or service. The content delivery service 120 can further include a data store 126 for maintaining dictionaries of textual terms, and generated outputs streams as described herein.

It will be appreciated by those skilled in the art that the content delivery service 120 may have fewer or greater components than are illustrated in FIG. 1. Thus, the depiction of the content delivery service 120 in FIG. 1 should be taken as illustrative. For example, in some embodiments, components of the content delivery service 120 may be executed by one or more virtual machines implemented in a hosted computing environment. A hosted computing environment may include one or more rapidly provisioned and released computing resources, which computing resources may include computing, networking or storage devices. Accordingly, while such components are illustrated as being logically grouped in FIG. 1, one skilled in the relevant art will appreciate that one or more aspects of the present application can include the content delivery service 120 as being implemented in multiple geographic areas. Additionally, not all geographic areas hosting portions of the content delivery service 120 will necessarily have all the same components or combination of components.

With continued reference to FIG. 1, the content delivery environment 100 also includes original content providers 130. Illustratively, the original content provider can include a plurality of servers for generating and transmitting content to the content delivery service 120. Illustratively, the content can include audio streaming content, audio segments, video files including audio content, video representations of audio segments (pre-processed) and the like. Although illustrated as separate components, the content providers 130 and user devices 102 can correspond to the same computing device, such as a user device that generates audio content and uploads it to the content delivery service and also interacts with the content delivery service 120 to create video representations of the uploaded content.

Figure 2:
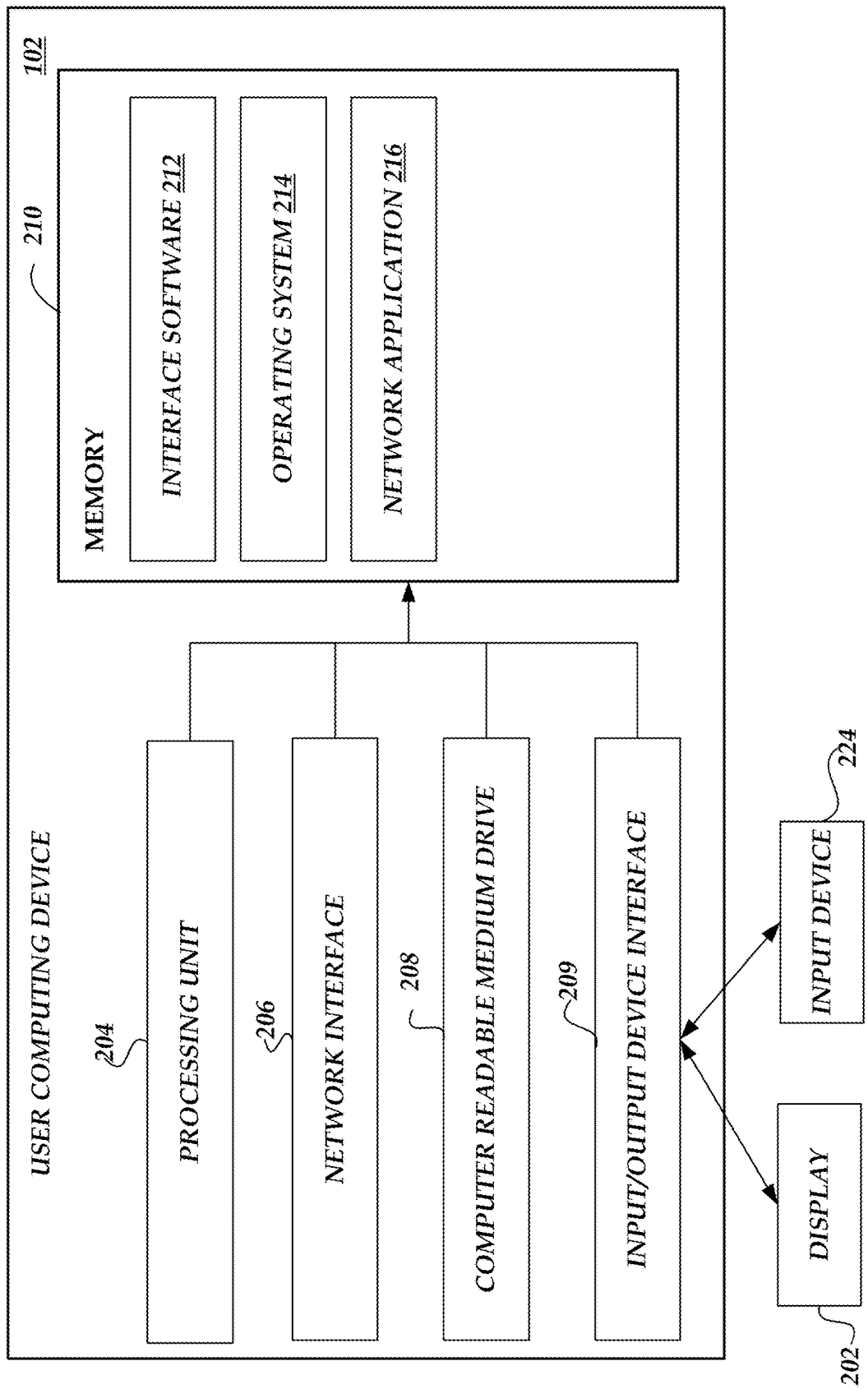
FIG. 2 is a block diagram of illustrative components of a user computing device configured to transmit requests for video clip information in accordance with an illustrative embodiment.

FIG. 2 depicts one embodiment of an architecture of an illustrative user computing device 102 that can generate content requests and process video representations of the audio content in accordance with the present application. The general architecture of the user computing device 102 depicted in FIG. 2 includes an arrangement of computer hardware and software components that may be used to implement aspects of the present disclosure. As illustrated, the user computing device 102 includes a processing unit 204, a network interface 206, an input/output device interface 209, an optional display 202, and an input device 224, all of which may communicate with one another by way of a communication bus.

The network interface 206 may provide connectivity to one or more networks or computing systems, such as the network 140 of FIG. 1 and the content delivery service 120 or the original content provider 130. The processing unit 204 may thus receive information and instructions from other computing systems or services via a network. The processing unit 204 may also communicate to and from memory 210 and further provide output information for an optional display 202 via the input/output device interface 209. The input/output device interface 209 may also accept input from the optional input device 224, such as a keyboard, mouse, digital pen, etc. In some embodiments, the user computing device 102 may include more (or fewer) components than those shown in FIG. 2.

The memory 210 may include computer program instructions that the processing unit 204 executes in order to implement one or more embodiments. The memory 210 generally includes RAM, ROM, or other persistent or non-transitory memory. The memory 210 may store an operating system 214 that provides computer program instructions for use by the processing unit 204 in the general administration and operation of the user computing device 102. The memory 210 may further include computer program instructions and other information for implementing aspects of the present disclosure. For example, in one embodiment, the memory 210 includes a network application 216, such as browser application or media player, for accessing content and communicating with the content delivery service 120. Additionally, the network application 216 can interface with one or more social media network resources, such as a web site, for publishing video representations of the audio content.

Figure 3:
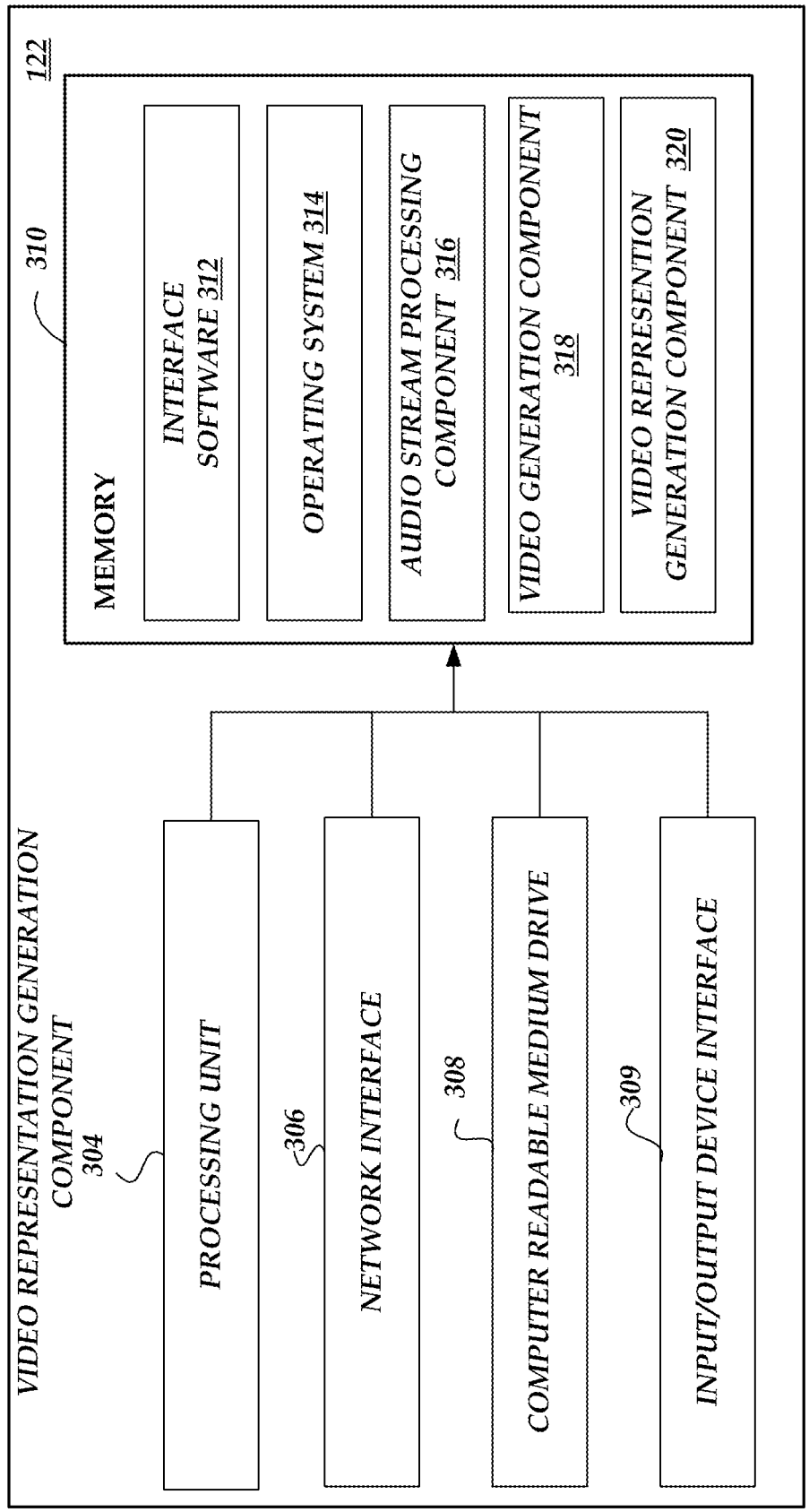
FIG. 3 is a block diagram of illustrative components of a video clip generation component configured to generate video representations of selected audio clips in accordance with an illustrative embodiment.

FIG. 3 depicts one embodiment of an architecture of an illustrative computing device for implementing various aspects of the video representation generation component 122 in accordance with aspects of the present application. The video representation generation component 122 can be a part of the instantiation of one or more virtual machine instances. Alternatively, the computing device 122 may a stand-alone device.

The general architecture of the video representation generation component 122 depicted in FIG. 3 includes an arrangement of computer hardware and software components that may be used to implement aspects of the present disclosure. As illustrated, the computing device 300 includes a processing unit 304, a network interface 306, a computer readable medium drive 308, an input/output device interface 309, all of which may communicate with one another by way of a communication bus. The components of the computing device 300 may be physical hardware components or implemented in a virtualized environment.

The network interface 306 may provide connectivity to one or more networks or computing systems, such as the network of FIG. 1. The processing unit 304 may thus receive information and instructions from other computing systems or services via a network. The processing unit 304 may also communicate to and from memory 310 and further provide output information. In some embodiments, the computing device 300 may include more (or fewer) components than those shown in FIG. 3.

The memory 310 may include computer program instructions that the processing unit 304 executes in order to implement one or more embodiments. The memory 310 generally includes RAM, ROM, or other persistent or non-transitory memory. The memory 310 may store an operating system 314 that provides computer program instructions for use by the processing unit 304 in the general administration and operation of the video representation generation component 122. The memory 310 may further include computer program instructions and other information for implementing aspects of the present disclosure. For example, in one embodiment, the memory 310 includes interface software 312 for receiving and processing requests from user devices 102, the content providers 130 or transmitting processed results. Memory 310 includes an audio stream processing component 316 for processing audio data to identify or generate one or more audio clips as described herein. The memory 310 further includes a video generation component 318 for selecting and processing audio segments or clips to generate audio representations as described herein. The video generation component 318 may also be utilized to interface with a standalone service, such as the video generation service 124. The memory 310 further includes a video representation generation processing component 320 for processing and forming a set of video representations of an identified set of audio segments/clips and responsive to a request to provide video representations of selected content.

As specified above, in one embodiment, the video representation generation component 122 illustrated in FIG. 3 can be implemented as physical computing devices or virtualized computing devices in a computing network. In another embodiment, the video representation generation component 122 may be implemented as logical components in a virtual computing network. Thus, aspects of the present application should not be limited to interpretation requiring a physical, virtual or logical embodiment unless specifically indicated as such.

Figure 4A:
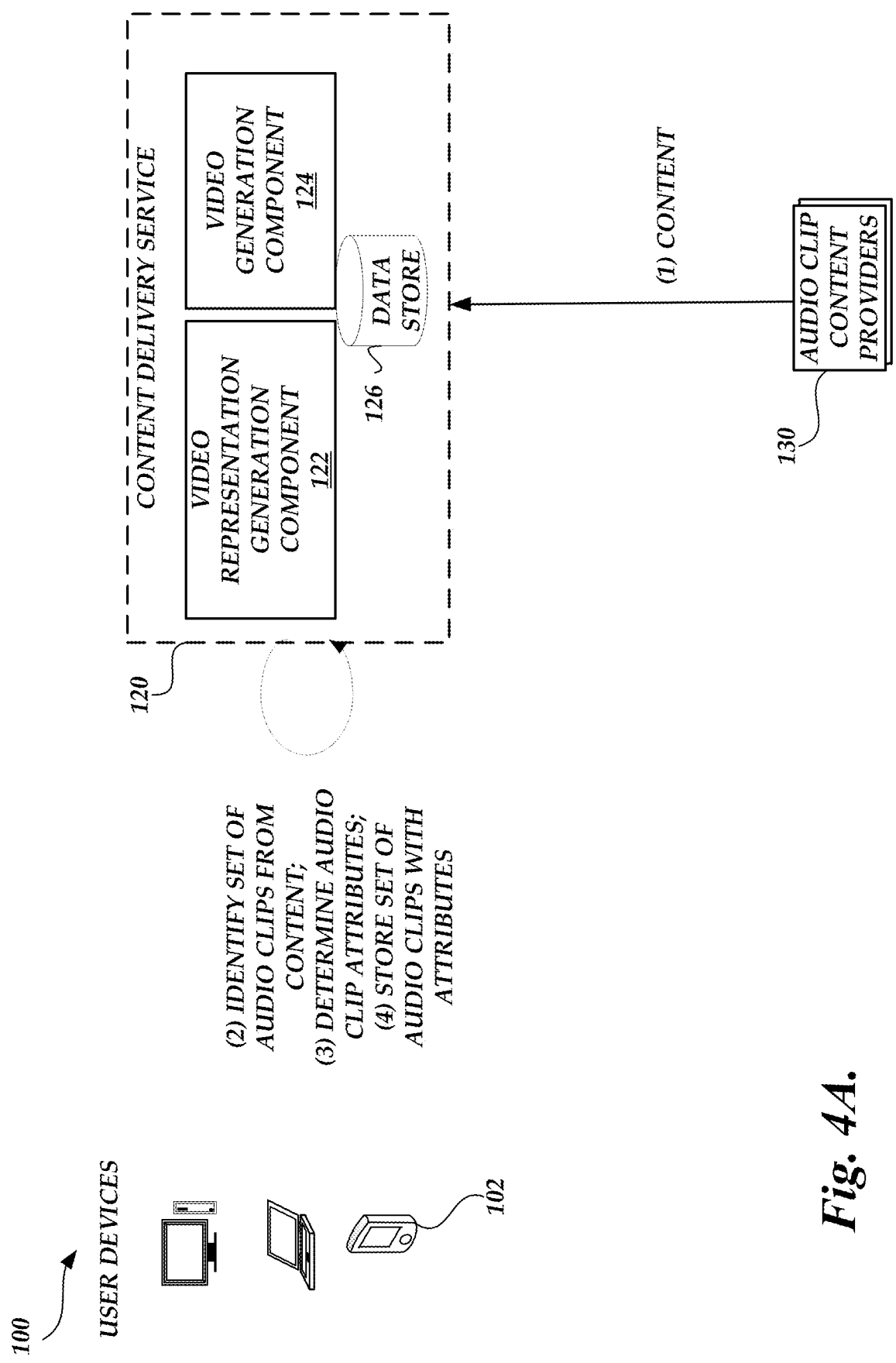
FIGS. 4A and 4B are block diagrams of the content delivery environment of FIG. 1 illustrating the interaction related to the selection of audio clips and the generation of video representations of the selected audio clips in accordance with an illustrative embodiment.
Figure 4B:
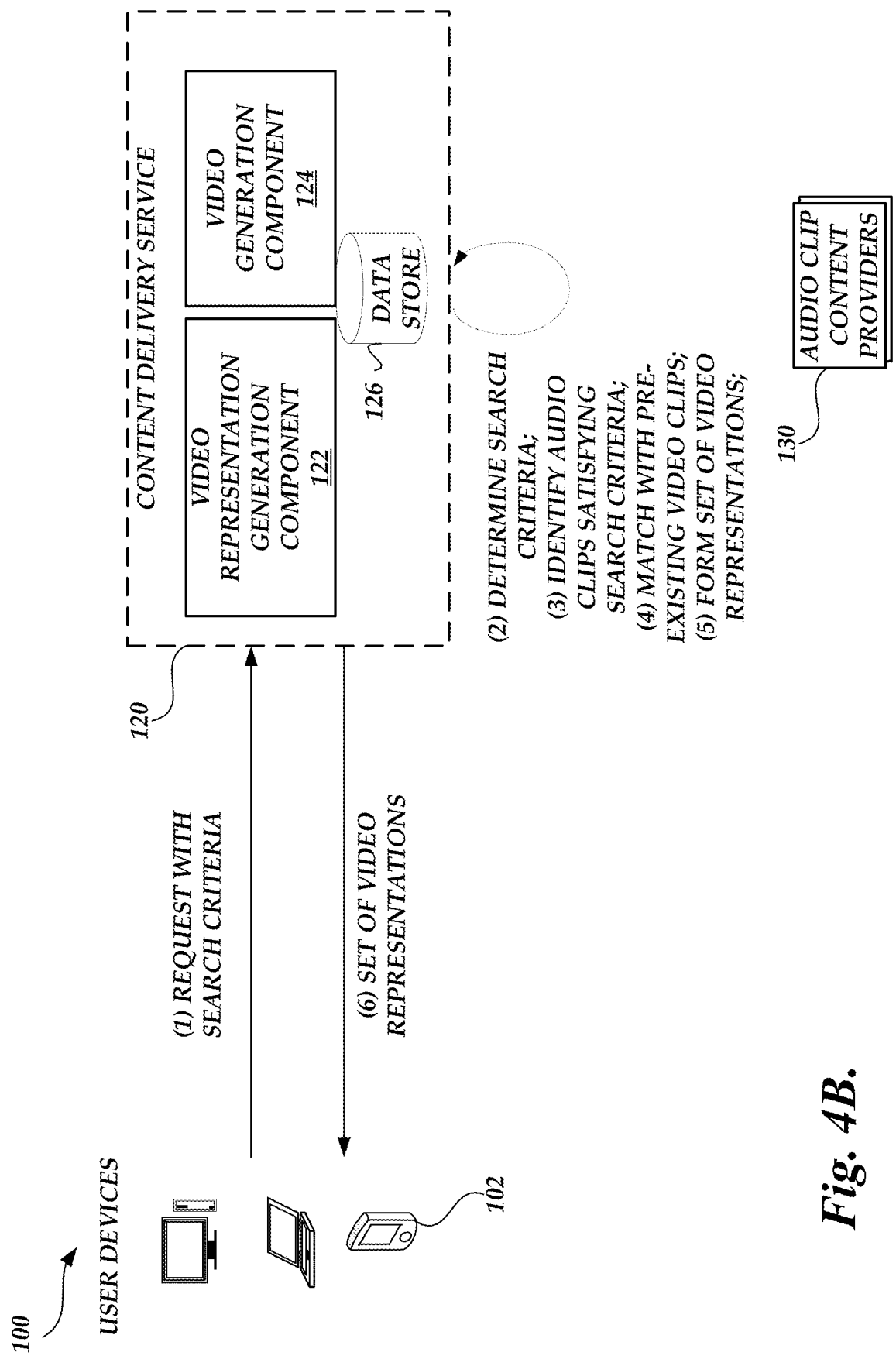

With reference to FIGS. 4A and 4B, illustrative interactions of at least a subset of the components of the content delivery environment 120 to generate video representations of content will be described. As described above, the content can illustratively include audio content that can be subdivided into one or more segments or clips. The content may further include streaming audio content, video files including an audio content portion or video representations previously created by the content provider 130. With reference first to FIG. 4A, illustrative interactions for the initial processing of the audio content will be described. At (1), the video representation generation component 122 obtains the content. Illustratively, the content can be provided by one or more content providers 130, such as via a content stream or other transmission. The video content can include an audio data portion that can be identified or parsed. Additionally, in some embodiments, the content can also be associated with metadata that facilitates the processing of either the audio content, video files, or the video representations. In one example, the metadata can include timing information that identifies one or more reference points in the audio content in which audio segments or clips may occur, such as chapter endings, scene or subject matter transitions, significant events (e.g., punchlines), and the like. The metadata can also include (additionally or alternatively) keywords or other indicia corresponding to the subject matter of the audio content or portions of the content that can be utilized to identify or group audio segments/clips. Such keywords can correspond to the topic/subject matter of the audio content, the originator of the audio content (e.g., a speaker or group of speakers) or other descriptive information.

At (2), the video representation generation component 122 identifies one or more audio segments or audio clips from the received content, such as an audio file. Illustratively, the video representation generation component 122 can cause the implementation of an audio processing algorithm, such as an AI algorithm or other processing algorithm, that is specifically configured to process audio data (or portions thereof) and additional metadata and identify one or more subdivisions of the audio data.

At (3), the video representation generation component 122 determines one or more attributes of the identified audio clips/segments. Illustratively, the result of the processing of the algorithm can include a return of one or more identified audio segments identified by a title or identifier and timing information identifying one or more reference points in the audio content that define a start and a finish for all possible audio segments. In some embodiments, the set of audio segments may be sequential such audio content can only correspond to a single audio segment/clip. In other embodiments, the set of audio segments may be organized into alternatives for possible selection by a user such that individual portions of the audio information may be included in different audio segments of different lengths.

In some embodiments, the video representation generation component 122 can further associate one or more keyword to the audio clips/segments. In this embodiment, the video representation generation component 122 can associate context keywords or identifiers that will facilitate the application of search criteria. As discussed above, in one example, the content provider 130 can provide the metadata of keywords to be associated with one or more portions of the content. In other examples, the video representation generation component 122 can process (or have processed) the audio content that can analyze the audio content for speech translation and associate different keywords with portions of the content. Still further, if the content includes video content, the video representation generation component 122 can process the video content, such as object analysis, to determine keywords for different portions of the audio content. At (4), the video representation generation component 122 store the audio clip information and associated attributes. In one embodiment, the video representation generation component 122 can subdivide the audio content into segments for separate storage. In other embodiments, the video representation generation component 122 can determine the subdivisions or how to subdivide while maintaining the audio content in the original form until required.

Turning now to FIG. 4B, illustrative interactions of at least a subset of the components of the content delivery environment 120 to generate video representations of content will be described. At (1), the video representation generation component 122 receives a request for generation of video representations. Illustratively, the request for video representations can be generated by a user device 102 that has access to audio content or can identify audio content. For example, a user device 102 may be accessing a network resource, such as a web page or network application that is accessing streamed audio content or downloaded audio content. The user device 102 can further have a control or selected object that generates the request for generating a video representation of a portion of the currently access audio content.

Figure 7:
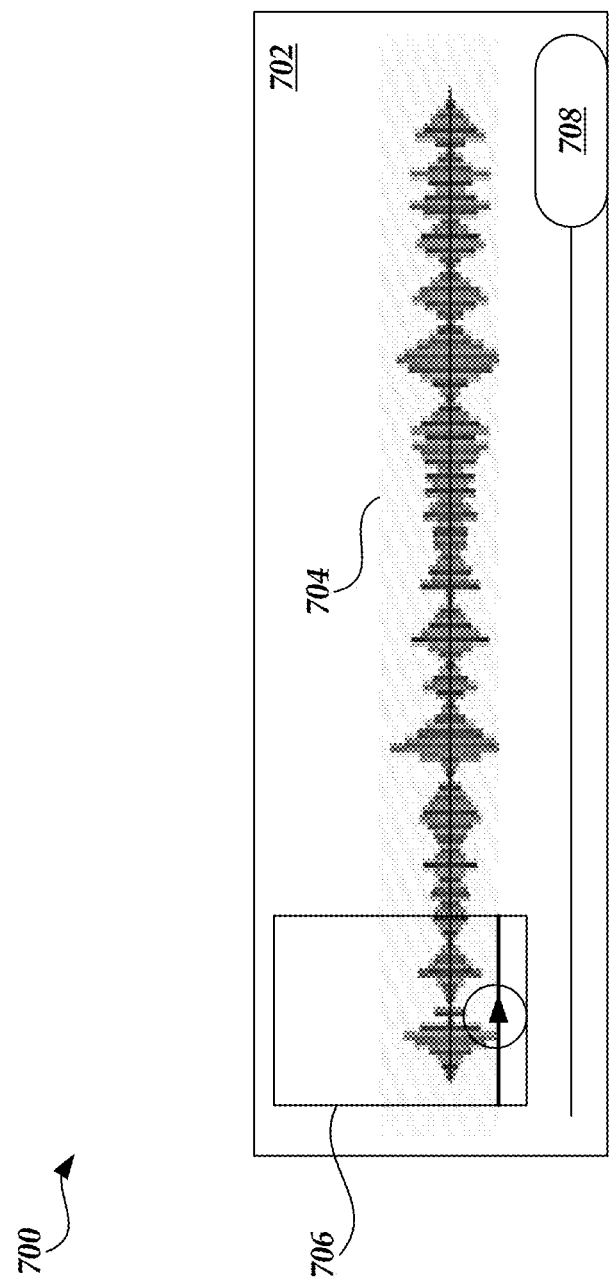
FIG. 7 is a block diagram of an interface generated by a user device to configure the selection of audio clips for generation of video representations in accordance with an illustrative embodiment.

Illustratively, the request identifies one or more portions of the audio content or provides search criteria that can be processed to identify the one or more portions (e.g., one or more audio clips or audio segments). With reference to FIG. 7, an illustrative interface 700 for facilitating the selection of audio segments or audio clips is provided. The interface includes a first portion 702 that can be included in a media application or browser application that provides a display and timeline 704 of the audio content or a portion. The interface 700 also includes a graphical control 706 than defines the length of the audio segment and the portions of the audio content that will be utilized in the generation of the audio segment. The size of the graphical control 706 can be adjusted in some embodiments such as by manipulating the control with a mouse or in pre-determined size increments (e.g., 30 seconds, 1 minute, 5 minutes, etc.). The graphical interface also includes a control 708 for transmitting or causing the transmission of the request to the video representation generation component 122. In some embodiments, the user device 102 or the video representation generation component 122 can make adjustments to the selection to include more or less audio content than selected by the control 706, such as corresponding to the closest determined audio segments boundaries or otherwise incorporating some form of buffer around the selected portion of the audio content. In other embodiments, the video representation generation component 122 can select the amount of audio content to correspond to established file size, video duration or other restrictions that can affect the ability to share the generated video representations.

Returning to FIG. 4B, in another embodiment, the user device 102 can obtain or capture one or more search criteria related to selection of the audio content. For example, the user device 102 can include a text input field that facilitates the entry of search terms. The user device 102 can further include suggested keywords that may be included in the metadata provided by the content provider with the original content. Still further, the search criteria may be based on historical searches or recommended content from external services. As will be described below, the search criteria can be applied to identify one or more audio segments that has been associated with keywords (as described previously). Still further, the search criteria can include timing information (e.g., track number or reference numbers) that points to specific or tagged portions of the audio content. In some embodiments, the user device 102 may include some combination of graphical control and manual entry.

At (2), the video representation generation component 122 determines the search criteria that will be utilized to identify relevant audio segments or audio clips. In some embodiments, the video representation generation component 122 can utilize the search criteria provided by the user device 102. In other embodiments, the video representation generation component 122 can supplement, modify or replace search criteria based on logical rules or profiles. For example, the video representation generation component 122 can be configured with minimum or maximum audio clip size, filters for terms or types of content, or pre-configured keywords.

At (3), the video representation generation component 122 identifies a set of audio clips/segments that satisfy the search criteria. Depending on the type of search criteria, the video representation generation component 122 can implement various processing of the previously processed audio information to determine which audio clips/segments should be included. The video representation generation component 122 can be configured with additional thresholds or rules that may limit the number of audio segments that are identified or utilize prioritization rules or criteria that order the set of audio segments. For example, the video representation generation component 122 can be configured to prioritize audio clips based on the frequency of an occurrence of a keyword, length of matching audio clip, or other metadata that may indicate that one audio segment may be considered more relevant or have a higher priority (e.g., the key scene in an audio play).

At (4), the video representation generation component 122 utilizes the set of identified audio clips/segments and determines whether any of the audio segments/portions have been previously rendered as video representations. Illustratively, the sub-division of audio content into segments facilitates the generation of video representations of portions of the audio content, which increases the utilization of computing resources. Additionally, the video representation generation component 122 can maintain any previously generated video representations such that the video representation generation component 122 can reuse the previously generated video representations. This further improves the efficiency of mitigating or possibly eliminating the need to generate video representations of the audio content in subsequent processing requests. For any audio segments that have not been previously generated as video representations, the video representation generation component 122 can generate or cause to be generated one or more video representations.

Figure 8:
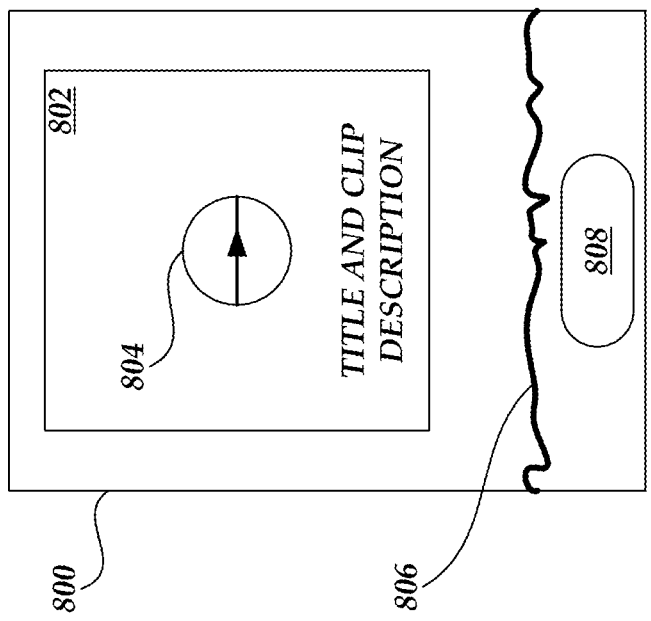
FIG. 8 is a block diagram of an interface of a video representation of selected audio clip in accordance with an illustrative embodiment.

With reference to FIG. 8, an illustrative interface 800 of a video representation of audio content is provided. The interface includes a first graphical portion 802 that represents still or video information that is rendered by the user device 102. The graphical portion 802 can include pictures, video and textual information that depicts the artist associated with the audio content, information about the content, such as keywords and time of play, custom textual descriptions, or videos regarding the generation of the audio content. The information included in the graphical portion 802 can be selected or edited by the user device 102, content provider 130 or other entity. In some embodiments, the interface 800 also includes a depiction of the audio waveform corresponding to the audio segment or audio segments so that the user is provided context of the audio content forming the video representations. The depiction of the audio waveform may be an actual representation of the audio waveform corresponding to the selected audio content or a standard/default waveform used for purposes of illustration. The interface 800 can also include controls 804 for controlling the playback of the video representation and a control 806 for causing a distribution of the video representation. As described above, the video representation can correspond to a video file that can be distributed by a user or utilized in accordance with video file distribution channel, such as social media network resources. The video file may be selected to facilitate such distribution based on supported file types, conformances to file size and duration limits or other configurations specified by individual social media networks.

Returning to FIG. 4B, at (5), the video representation generation component 122 forms the set of video representations that correspond to the request. In one embodiment, the set of video representations may correspond to a single video representation corresponding to a single audio segment/clip. In other embodiments, the set of video representations can correspond to multiple audio segments, that may not necessarily be sequential in nature. Still further, the set of audio segments can illustratively include audio segments from multiple audio files or authors, such as a custom set of video representations. At (6), the video representation generation component 122 can transmit the set of video representations to the user device 102 responsive to the request. In other embodiments, the video representation generation component 122 can publish the set of video representations to a network resource, such as social media network resources, storage or other distribution.

Figure 5:
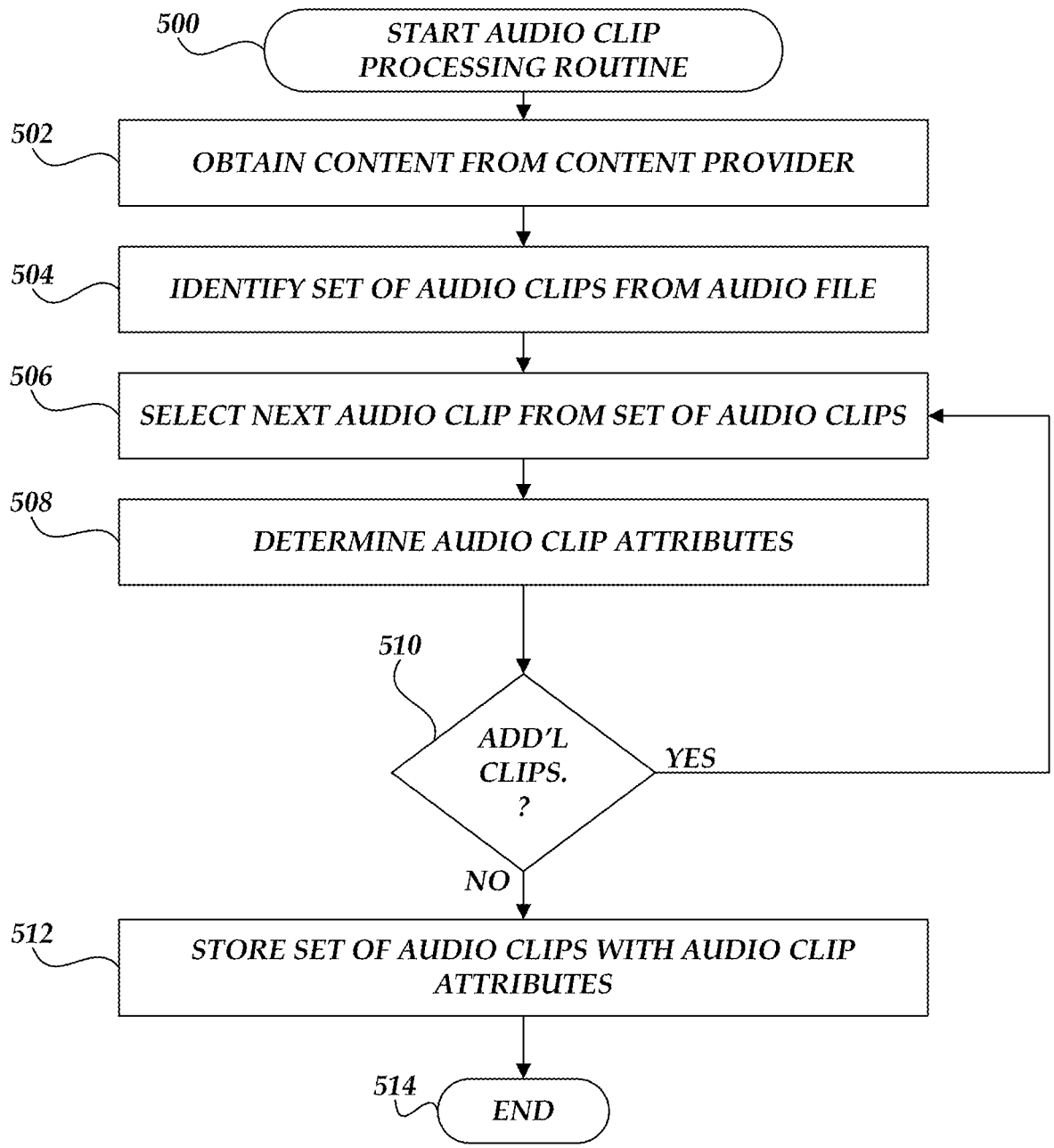
FIG. 5 is a flow diagram illustrative of an audio segment processing routine implemented by a video clip generation component.

Turning now to FIG. 5, an illustrative routine 500 for processing audio content will be described. Routine 500 may be illustratively implemented by the video representation generation component 122. At block 502, the video representation generation component 122 obtains the content. Illustratively, the content can be provided by one or more content providers 130, such as via a content stream or other transmission. The video content can include an audio data portion that can be identified or parsed. Additionally, in some embodiments, the content can also be associated with metadata that facilitates the processing of either the audio content, video files or video representations. In one example, the metadata can include timing information that identifies one or more reference points in the audio content in which audio segments or clips may occur, such as chapter endings, scene or subject matter transitions, significant events (e.g., punchlines), and the like. The metadata can also include (additionally or alternatively) keywords or other indicia corresponding to the subject matter of the audio content or portions of the content that can be utilized to identify or group audio segments/clips. Such keywords can correspond to the topic/subject matter of the audio content, the originator of the audio content (e.g., a speaker or group of speakers) or other descriptive information.

At block 504, the video representation generation component 122 identifies one or more audio segments or audio clips from the received content, such as an audio file. Illustratively, the video representation generation component 122 can cause the implementation of an audio processing algorithm, such as an AI algorithm or other processing, that is specifically configured to process audio data (or portions thereof) and additional metadata and identify one or more subdivisions of the audio data.

At block 506, the video representation generation component 122 enters into an iterative process for processing the audio information by identifying and selecting the next identifiable segment/clip in the audio segment. At block 508, the video representation generation component 122 then determines one or more attributes of the identified audio clips/segments. Illustratively, the result of the processing of the algorithm can include a return of one or more identified audio segments identified by a title or identifier and timing information identifying one or more reference points in the audio content that define a start and a finish for all possible audio segments. In some embodiments, the set of audio segments may be sequential such audio content can only correspond to a single audio segment/clip. In other embodiments, the set of audio segments may be organized into alternatives for possible selection by a user such that individual portions of the audio information may be included in different audio segments of different lengths.

In some embodiments, the video representation generation component 122 can further associate one or more keywords to the audio clips/segments. In this embodiment, the video representation generation component 122 can associate context keywords or identifiers that will facilitate the application of search criteria. As discussed above, in one example, the content provider 130 can provide the metadata of keywords to be associated with one or more portions of the content. In other examples, the video representation generation component 122 can process (or have processed) the audio content that can analyze the audio content for speech translation and associate different keywords with portions of the content. Still further, if the content includes video content, the video representation generation component 122 can process the video content, such as object analysis, to determine keywords for different portions of the audio content. At decision block 510, a determination is made whether additional audio segments need to be processed, including the next sequential audio segment or alternative audio segments. If so, the routine 500 returns to block 506.

Alternatively, once all the audio segments are processed, at block 512, the video representation generation component 122 store the audio clip information and associated attributes. In one embodiment, the video representation generation component 122 can subdivide the audio content into segments for separate storage. In other embodiments, the video representation generation component 122 can determine the subdivisions or how to subdivide while maintaining the audio content in the original form until required. Routine 500 terminates at block 514.

Figure 6:
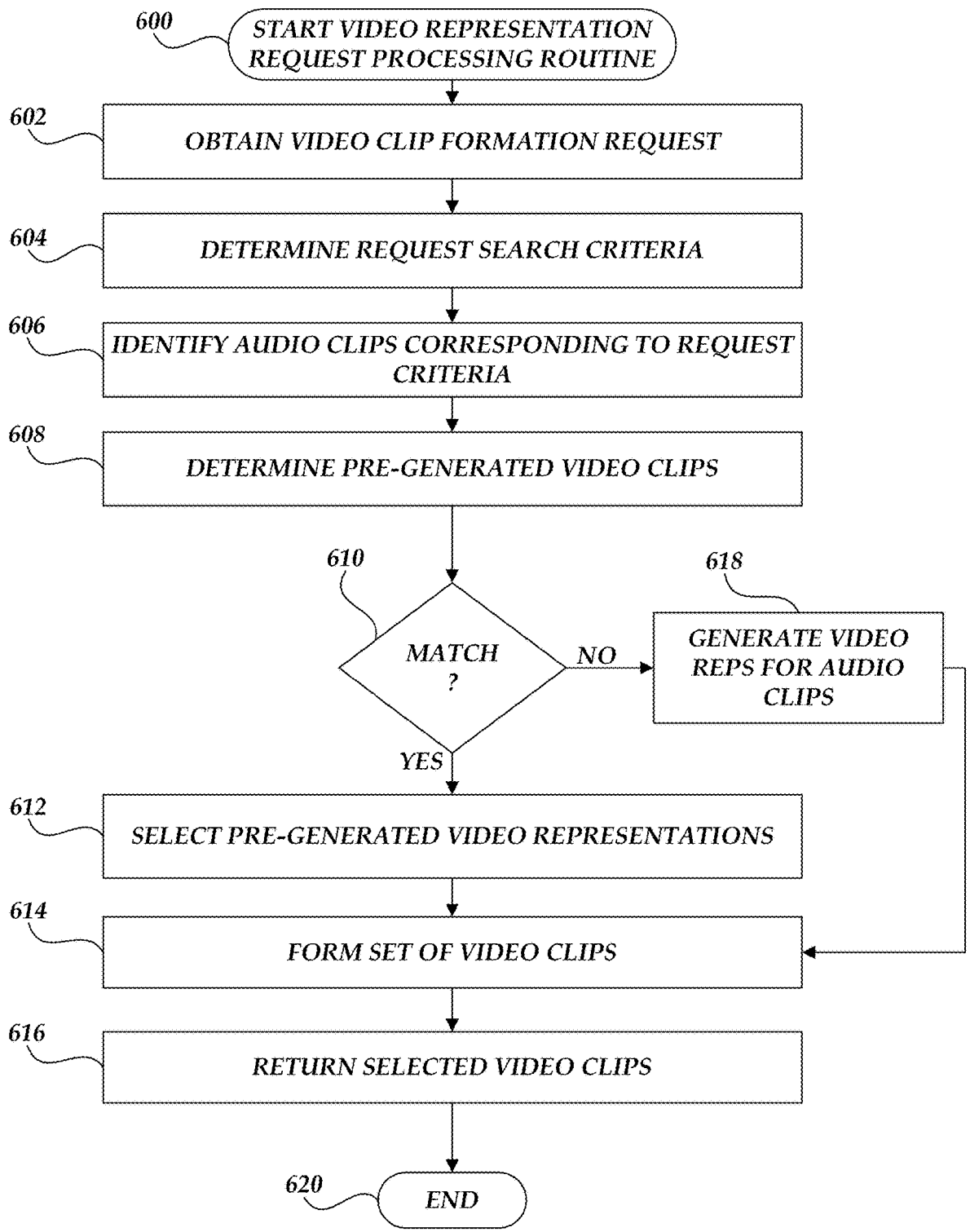
FIG. 6 is a flow diagram illustrative of video representation request processing routine implemented by a video clip generation component.

Turning now to FIG. 6, a routine 600 for processing video segment requests will be described. Routine 600 is illustratively implemented by the video representation generation component 122 responsive to a request. At block 602, the video representation generation component 122 receives a request for generation of video representations. Illustratively, the request for video representations can be generated by a user device 102 that has access to audio content or can identify audio content. For example, a user device 102 may be accessing a network resource, such as a web page or network application that is accessing streamed audio content or downloaded audio content. The user device 102 can further have a control or selected object that generates the request for generating a video representation of a portion of the currently access audio content.

Illustratively, the request identifies one or more portions of the audio content or provides search criteria that can be processed to identify the one or more portions (e.g., one or more audio clips or audio segments). An illustrative interface 700 for facilitating the selection of audio segments or audio clips was previously described.

At block 604, the video representation generation component 122 determines the search criteria that will be utilized to identify relevant audio segments or audio clips. In some embodiments, the video representation generation component 122 can utilize the search criteria provided by the user device 102. In other embodiments, the video representation generation component 122 can supplement, modify or replace search criteria based on logical rules or profiles. For example, the video representation generation component 122 can be configured with minimum or maximum audio clip size, filters for terms or types of content, or pre-configured keywords.

At block 606, the video representation generation component 122 identifies a set of audio clips/segments that satisfy the search criteria. Depending on the type of search criteria, the video representation generation component 122 can implement various processing of the previously processed audio information to determine which audio clips/segments should be included. The video representation generation component 122 can be configured with additional thresholds or rules that may limit the number of audio segments that are identified or utilize prioritization rules or criteria that order the set of audio segments. For example, the video representation generation component 122 can be configured to prioritize audio clips based on the frequency of an occurrence of a keyword, length of matching audio clip, or other metadata that may indicate that one audio segment may be considered more relevant or have a higher priority (e.g., the key scene in an audio play).

At block 608, the video representation generation component 122 utilizes the set of identified audio clips/segments and determines whether any of the audio segments/portions have been previously rendered as video representations. As described above, the sub-division of audio content into segments facilitates the generation of video representations of portions of the audio content, which increases the utilization of computing resources. Additionally, the video representation generation component 122 can maintain any previously generated video representations such that the video representation generation component 122 can reuse the previously generated video representations, including video representations provided by the content provider 130. This further improves the efficiency of mitigating or possibly eliminating the need to generate video representations of the audio content in subsequent processing requests. Accordingly, at decision block 610, a test is conducted to determine whether the video representation generation component 122 can match any previously generated video representations. Illustratively, the match can be limited to exact matches or partial matches based on overlapping thresholds (e.g., more than 80% overlapping content).

For any matching audio segments, at block 612, the video representation generation component 122 utilizes the pre-generated video representations, such as from storage or a service. Alternatively, at block 618, for any audio segments that have not been previously generated as video representations, the video representation generation component 122 can generate or cause to be generated one or more video representations. Illustrative examples of a video representation corresponding to one or more audio segments was described with regard to FIG. 8.

At block 614, the video representation generation component 122 forms the set of video representations that correspond to the request. In one embodiment, the set of video representations may correspond to a single video representation corresponding to a single audio segment/clip. In other embodiments, the set of video representations can correspond to multiple audio segments, that may not necessarily be sequential in nature. Still further, the set of audio segments can illustratively include audio segments from multiple audio files or authors, such as a custom set of video representations. At block 616, the video representation generation component 122 can transmit the set of video representations to the user device 102 responsive to the request. In other embodiments, the video representation generation component 122 can publish the set of video representations to a network resource, such as social media network resources, storage or other distribution. Routine 600 terminates at block 620.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for generating video representation information for content, the system comprising:
one or more computing devices associated with a video representation generation component, wherein the video representation generation component is configured to:
receive audio content from an audio content provider;
receive search criteria from a user device, the search criteria corresponding to a request to view video representations of portions of the audio content;
responsive to receiving the search criteria:
cause a processing of the audio content data to form a set of audio clips corresponding to the search criteria;
determine a first subset of the set of audio clips that are associated with previously-generated video representations, the first subset including a first audio clip having an exact match to a first previously-generated video representation and including a second audio clip having a partial match to a second previously-generated video representation, the partial match having at least a preconfigured threshold amount of content representing an exact match between the second audio clip and the second previously-generated video representation;
determine a second subset of the set of audio clips that are not associated with previously-generated video representations;
retrieve the previously-generated video representations associated with the first subset;
generate new video representations corresponding to the second subset;
form a set of video representations, the set including the retrieved previously-generated video representations and the generated new video representations; and
transmitting the set of video representations, wherein transmitting the set of video representations includes transmitting the set of video representations to the user device.

2. The system of claim 1, wherein the search criteria corresponds to timing information associated with the audio content.

3. The system of claim 1, wherein the search criteria corresponds to metadata associated with the audio content.

4. The system of claim 1, wherein the set of video representations include at least one graphic to be rendered as video content.

5. The system of claim 1, wherein set of video representations include a graphical waveform corresponding to one or more audio clips of the set of audio clips.

6. The system of claim 1, wherein transmitting the set of video representations includes publishing the set of visual representations to one or more social media network resources.

7. A computer-implemented method for generating video representations of audio information comprising:
receiving search criteria from a user device, the search criteria corresponding to a request to view video representations of portions of received content;
responsive to receiving the search criteria:
causing a processing of the audio content data to form a set of audio clips corresponding to the search criteria;
determining a first subset of the set of audio clips that are associated with previously-generated video representations, the first subset including a first audio clip having an exact match to a first previously-generated video representation and including a second audio clip having a partial match to a second previously-generated video representation, the partial match having at least a pre-configured threshold amount of content representing an exact match between the second audio clip and the second previously-generated video representation;
determining a second subset of the set of audio clips that are not associated with previously-generated video representations;
retrieving the previously-generated video representations associated with the first subset;
generating new video representations corresponding to the second subset;
forming a set of video representations, the set including the retrieved previously-generated video representations and the generated new video representations; and transmitting the set of video representations, wherein transmitting the set of video representations includes transmitting the set of video representations to the user device.

8. The computer-implemented method of claim 7 further comprising receiving audio content from an audio content provider.

9. The computer-implemented method of claim 7, wherein the search criteria corresponds to timing information associated with the audio content.

10. The computer-implemented method of claim 9, wherein the timing information is selected from a graphical user interface.

11. The computer-implemented method of claim 7, wherein the search criteria corresponds to metadata associated with the audio content.

12. The computer-implemented method of claim 7, wherein the set of visual representations include at least one graphic to be rendered as video content.

13. The computer-implemented method of claim 7, include a graphical waveform corresponding to one or more audio clips of the set of audio clips.

14. A non-transitory computer-readable medium comprising memory with instructions encoded thereon for generating video representations of audio information, the instructions, when executed, causing one or more processors to perform operations, the instructions comprising instructions to:
   receive audio content from an audio content provider;
   receive search criteria from a user device, the search criteria corresponding to a request to view video representations of portions of the audio content;
   responsive to receiving the search criteria:
      cause a processing of the audio content data to form a set of audio clips corresponding to the search criteria;
      determine a first subset of the set of audio clips that are associated with previously-generated video representations, the first subset including a first audio clip having an exact match to a first previously-generated video representation and including a second audio clip having a partial match to a second previously-generated video representation, the partial match having at least a pre-configured threshold amount of content representing an exact match between the second audio clip and the second previously-generated video representation;
      determine a second subset of the set of audio clips that are not associated with previously-generated video representations;
      retrieve the previously-generated video representations associated with the first subset;
      generate new video representations corresponding to the second subset;
      form a set of video representations, the set including the retrieved previously-generated video representations and the generated new video representations; and
      transmitting the set of video representations, wherein transmitting the set of video representations includes transmitting the set of video representations to the user device.

15. The non-transitory computer-readable medium of claim 14, wherein the instructions further comprise instructions to receive audio content from an audio content provider.

16. The non-transitory computer-readable medium of claim 14, wherein the search criteria corresponds to timing information associated with the audio content or metadata associated with the audio content.

17. The non-transitory computer-readable medium of claim 14, wherein the set of video representations include at least one graphic to be rendered as video content and at least one graphical waveform.

18. The system of claim 1, wherein the video representation generation component is further configured to:
   process the search criteria using a set of rules associated with the user device, wherein the processing includes one or more of supplementing, modifying, or replacing the search criteria; and
   cause the processing of the audio content based on the processed search criteria.

* * * * *